US008848241B2

(12) United States Patent
Yamamichi

(10) Patent No.: US 8,848,241 B2
(45) Date of Patent: Sep. 30, 2014

(54) IMAGE PROCESSING APPARATUS AND IMAGE PROCESSING METHOD

(75) Inventor: Masaki Yamamichi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 120 days.

(21) Appl. No.: 13/224,597

(22) Filed: Sep. 2, 2011

(65) Prior Publication Data

US 2012/0057177 A1    Mar. 8, 2012

(30) Foreign Application Priority Data

Sep. 8, 2010   (JP) ................................. 2010-201082

(51) Int. Cl.
*H04N 1/60*    (2006.01)
(52) U.S. Cl.
CPC ...................... *H04N 1/60* (2013.01)
USPC .......................................... 358/1.9; 358/1.15
(58) Field of Classification Search
USPC ........................................ 358/1.14, 1.15, 1.9
See application file for complete search history.

(56) References Cited

U.S. PATENT DOCUMENTS 5,678,133 A * 10/1997 Siegel .............................. 399/67
2010/0097656 A1 * 4/2010 Misawa et al. ................. 358/2.1

FOREIGN PATENT DOCUMENTS

| JP | 2006-251722 A | 9/2006 |
| JP | 2010-091813 A | 4/2010 |
| JP | 2010091813 A | * 4/2010 |
| WO | WO 2010041460 A1 | * 4/2010 |

* cited by examiner

*Primary Examiner* — Mark Zimmerman
*Assistant Examiner* — Richa Mishra
(74) *Attorney, Agent, or Firm* — Canon USA, Inc. IP Division

(57) ABSTRACT

An image processing apparatus includes a designation unit configured, in printing each of input first and second data by using a spot color printing material, to designate a spot color effect achieved by using the spot color printing material, a first determination unit configured to determine a paper attribute for implementing the designated spot color effect for the first data, a second determination unit configured, to determine a paper attribute for implementing the designated spot color effect for the second data, a setting unit configured to execute a setting of a print appearance for printing the first and the second data on one sheet, and sheet determination unit configured to determine a sheet having the attribute determined by the first and the second determination unit as a sheet onto which the first and the second data is to be printed according to the set print appearance.

9 Claims, 18 Drawing Sheets

FIG.4

PRINT SETTING 4000

DOCUMENT SIZE(S): A4

OUTPUT PAPER SIZE(Z): SAME AS DOCUMENT SIZE

NUMBER OF PRINTS(C): 1 COPIES (1~9999)

PRINT ORIENTATION(O): ● PORTRAIT ○ LANDSCAPE

PAGE LAYOUT(L): 1 1 in 1 (STANDARD)

PRINT METHOD(Y): ONE-SIDED PRINTING

OK    CANCEL

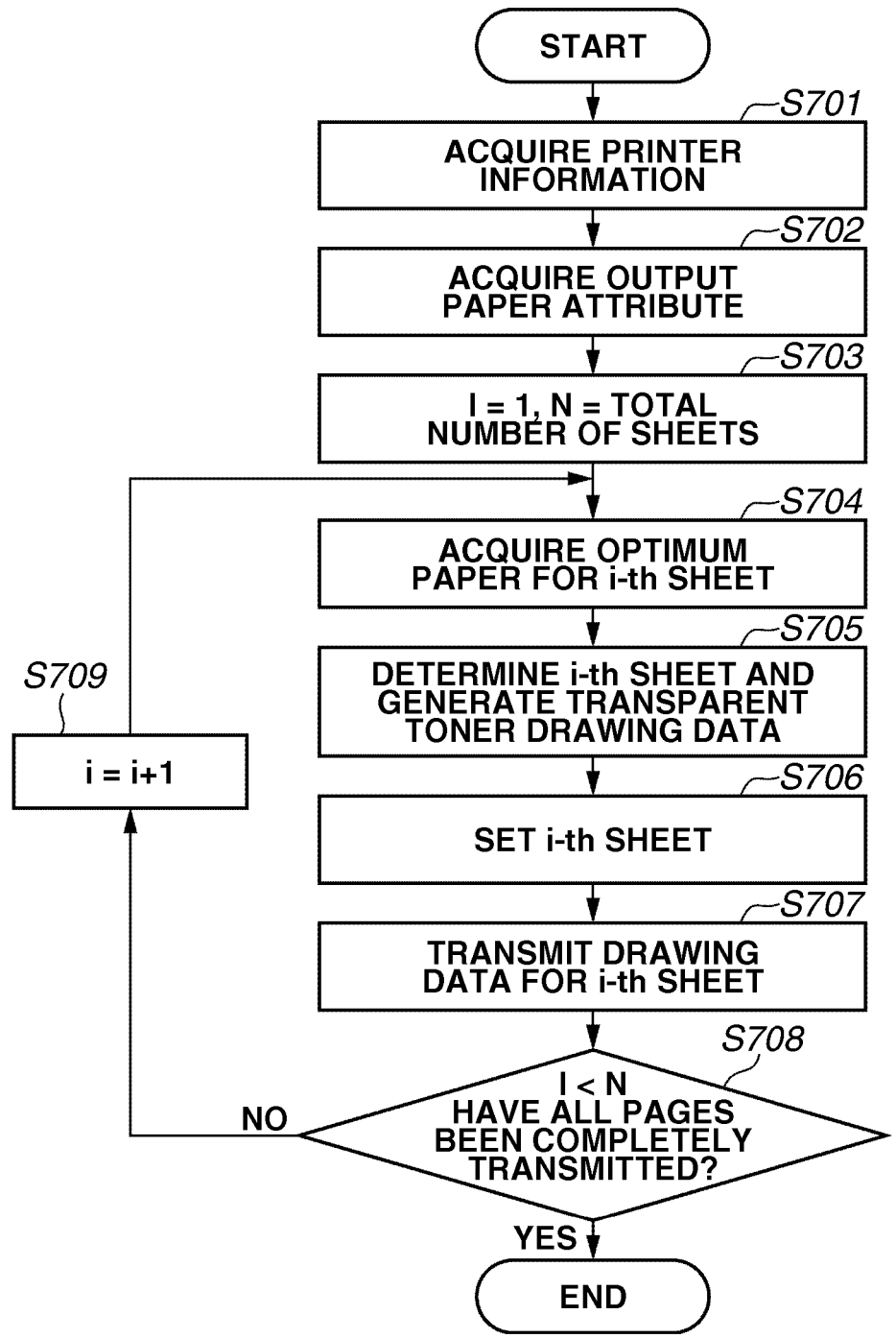

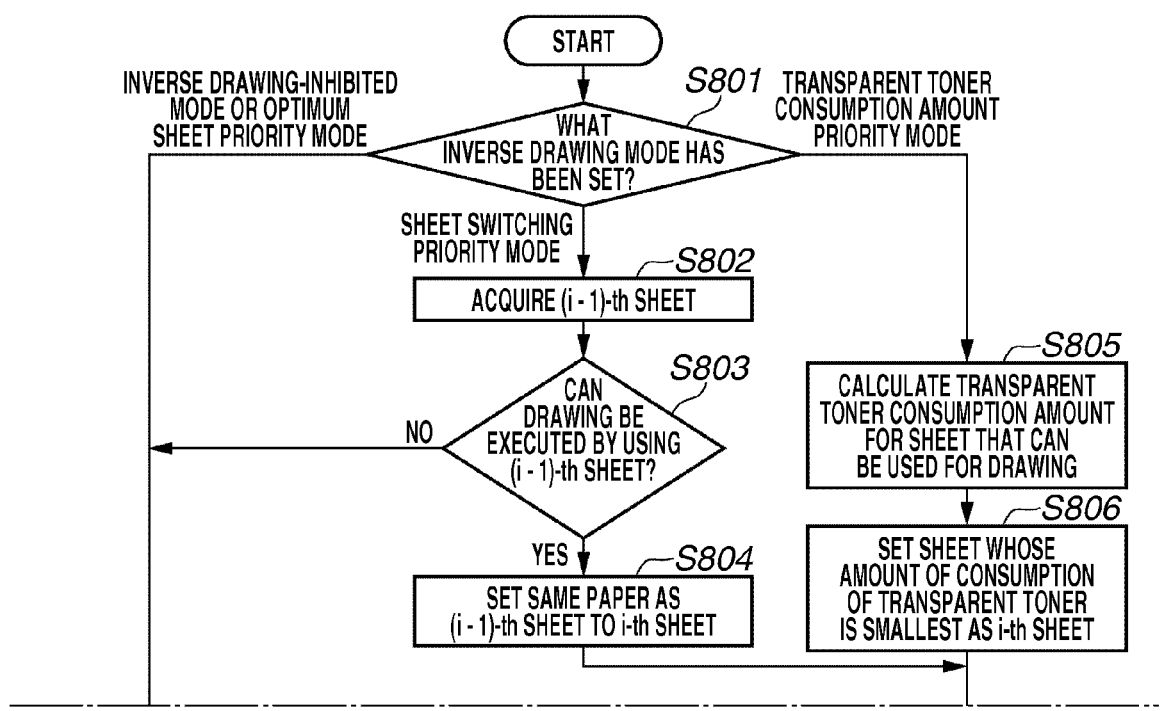

FIG.11
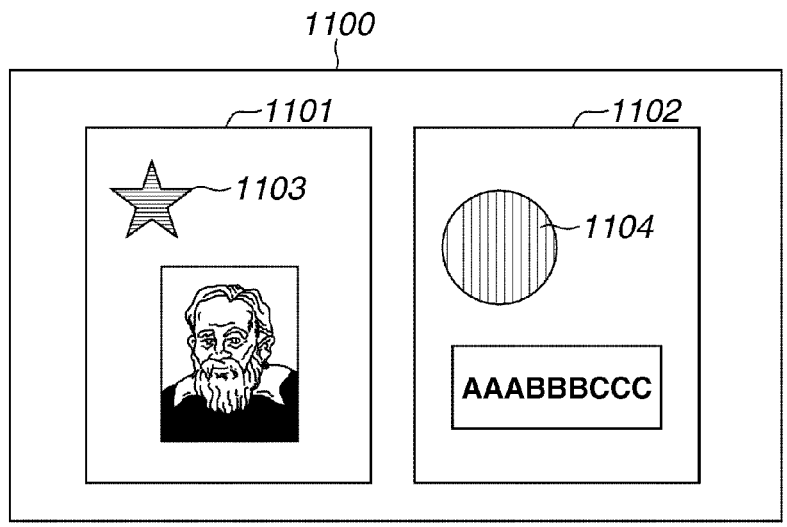
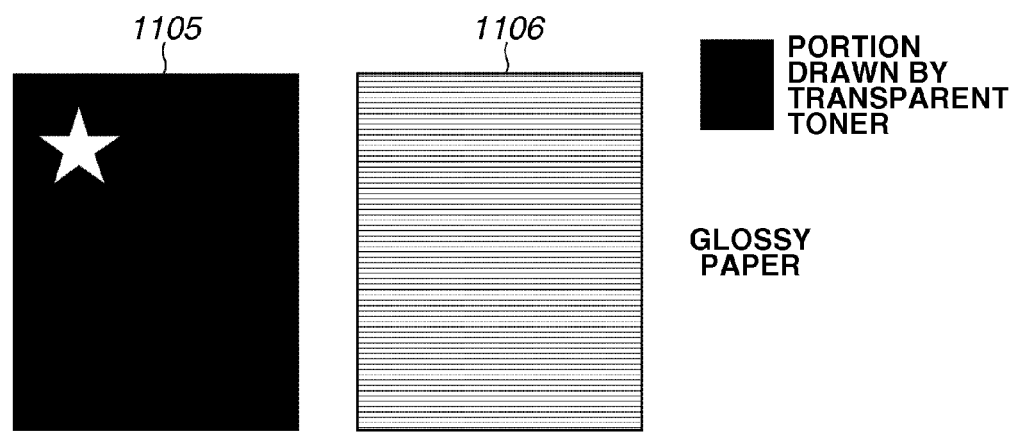
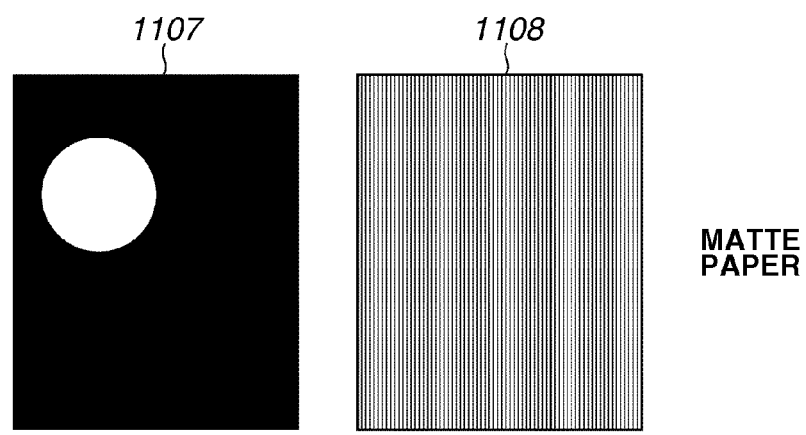

FIG.14
PORTION DRAWN BY TRANSPARENT TONER
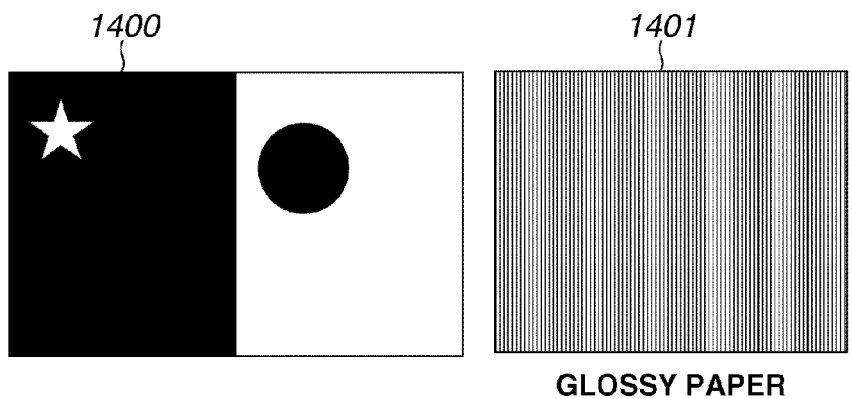
GLOSSY PAPER

FIG.17
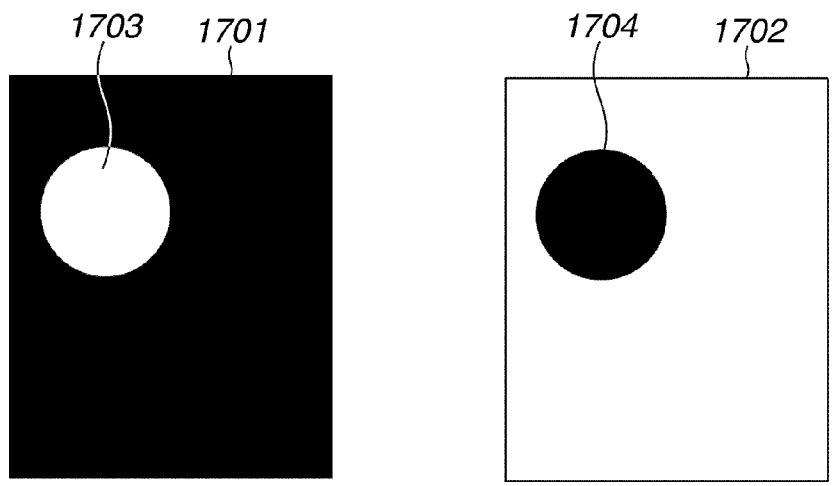

IMAGE PROCESSING APPARATUS AND IMAGE PROCESSING METHOD

BACKGROUND OF THE INVENTION

1. Field of the Invention

The present invention relates to an image processing apparatus configured to form an image on a recording medium by using a spot color toner, and an image processing method.

2. Description of the Related Art

An image processing apparatus generally captures drawing data supplied from a host computer, and executes image processing based on the captured drawing data. A method of the image processing includes an electrophotographic method.

In the image processing apparatus that uses the electrophotographic method, an electric charger charges a photosensitive drum. Furthermore, the photosensitive drum is irradiated with light according to image data to form an electrostatic latent image on the photosensitive drum. In addition, a development device applies toner to develop the electrostatic latent image into a visible image. Subsequently, the developed toner image is transferred from the photosensitive drum to a recording sheet. Furthermore, heat and pressure are applied to the transferred image to fix the image on the sheet.

Japanese Patent Application Laid-Open No. 2006-251722 discusses an electrophotographic type image processing apparatus, which uses a spot color printing material for a part of or the entire image to be printed as well as using cyan (C), magenta (M), yellow (Y), and black (K) toners, which are process colors (i.e., colors of basic printing materials). The spot color printing material includes a transparent toner.

The light reflection performance on a surface having the image printed thereon in a part thereof by using the transparent toner may vary. Accordingly, a decorative effect can be expressed. In addition, by appropriately combining a type of paper (paper type) to be used in image processing and drawing data to be printed by the transparent toner, a decorative effect, such as glossiness and a matte effect, can be provided to the portion of a surface of the sheet used in the image processing in which the image is printed by using the transparent toner.

However, the decorative effect desired by the user may not be implemented unless an appropriate type of paper is used in the image processing. In order to prevent this, Japanese Patent Application Laid-Open No. 2010-091813 discusses a method of changing the paper type and drawing data to be printed by using the transparent toner according to the decorative effect designated by the user and a user-prioritized setting, such as an image quality and a printing speed.

A print appearance setting, such as a two-sided printing setting, can be further set to a sheet designated to express a decorative effect to print or output an image by using the transparent toner. If a print appearance is set, a page to be printed by using the transparent toner may be designated to be printed on a back surface of a specific sheet.

If the user designates a glossiness effect to an object to be printed on a surface of a first sheet, a glossiness attribute is required as an attribute of the first sheet. On the other hand, if the user designates a matte effect to an object to be printed on a surface of a second sheet, a matte attribute is required as an attribute of the second sheet.

In printing the document data described above, the document data is printed by using a glossy paper for the first sheet and a matte paper for the second sheet. However, if two-sided printing is selected for printing the document data like this, a drawing content for the second sheet may be output on the back surface of the first sheet. Accordingly, in this case, it becomes necessary to newly set and use a sheet whose front surface has a glossy attribute and whose back surface has a matte attribute as the first sheet.

SUMMARY OF THE INVENTION

According to an aspect of the present invention, An image processing apparatus includes a designation unit configured, in printing each of input first drawing data and second drawing data by using a spot color printing material, to designate a spot color effect achieved by using the spot color printing material, a first output sheet attribute determination unit configured to determine a paper attribute for implementing the spot color effect designated for the first drawing data by the designation unit, a second output sheet attribute determination unit configured to determine a paper attribute for implementing the spot color effect designated for the second drawing data by the designation unit, a setting unit configured to execute a setting of a print appearance for printing the first drawing data and the second drawing data on one output sheet, and a determination unit configured to determine a sheet having the attribute determined by the first output sheet attribute determination unit and the attribute determined by the second output sheet attribute determination unit as an output sheet onto which the first drawing data and the second drawing data is to be printed according to the print appearance set by the setting unit.

An aspect according to the present exemplary embodiment is configured to select a sheet according to a content of document data to be printed and output by considering a paper attribute including a print appearance and the surface characteristic of the sheet if a required paper attribute for printing and outputting an image changes according to document data including spot color data and according to the print appearance.

Accordingly, an aspect of the present invention can achieve an output result, which satisfies the print appearance of the print product that is the final product, desired by a user (i.e., a print product generated by printing data expressing a spot color effect by using a designated spot color printing material (spot color toner) and printed according to a designated print appearance).

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to describe the principles of the invention.

FIG. 4 illustrates an example user interface for executing a print setting.

FIG. 7 is a flow chart illustrating an example flow of print processing.

FIG. 11 illustrates examples of text data and an output result of one-sided printing.

FIG. 14 illustrates an example output result of 2-in-1 printing.

FIG. 17 illustrates an example of a portion of an image drawn by negative/positive inversion.

DESCRIPTION OF THE EMBODIMENTS

Various exemplary embodiments, features, and aspects of the invention will be described in detail below with reference to the drawings.

The scope of the present invention, which is claimed by attached claims, is not limited to the following exemplary embodiments of the present invention. Characteristics of the present invention, which are described below, and any combination thereof are not necessarily required to implement the present invention.

In the present invention, it is supposed that a transparent toner is used as a spot color printing material. However, toner or ink, which can change the level of glossiness on a medium, such as a print paper or a medium on which toner is applied, can be used as the spot color printing material instead of the transparent toner. More specifically, instead of using the transparent toner, other spot color printing material, such as a light color toner or a transparent ink, can be used.

In the present invention, a "transparent toner" refers to a transparent printing material having a characteristic of adding a transparent image. A region printed by using the transparent toner is hardly visible. If the transparent toner is used, a special feel or effect, such as glossiness, an enamel-like effect, or a matte effect, which is different from the effect achieved when only color toners are used, can be expressed. The special feel or effect may differ according to a combination of the printing material and the paper used in printing. The combination will be described in detail below.

<Configuration>

Figure 1:
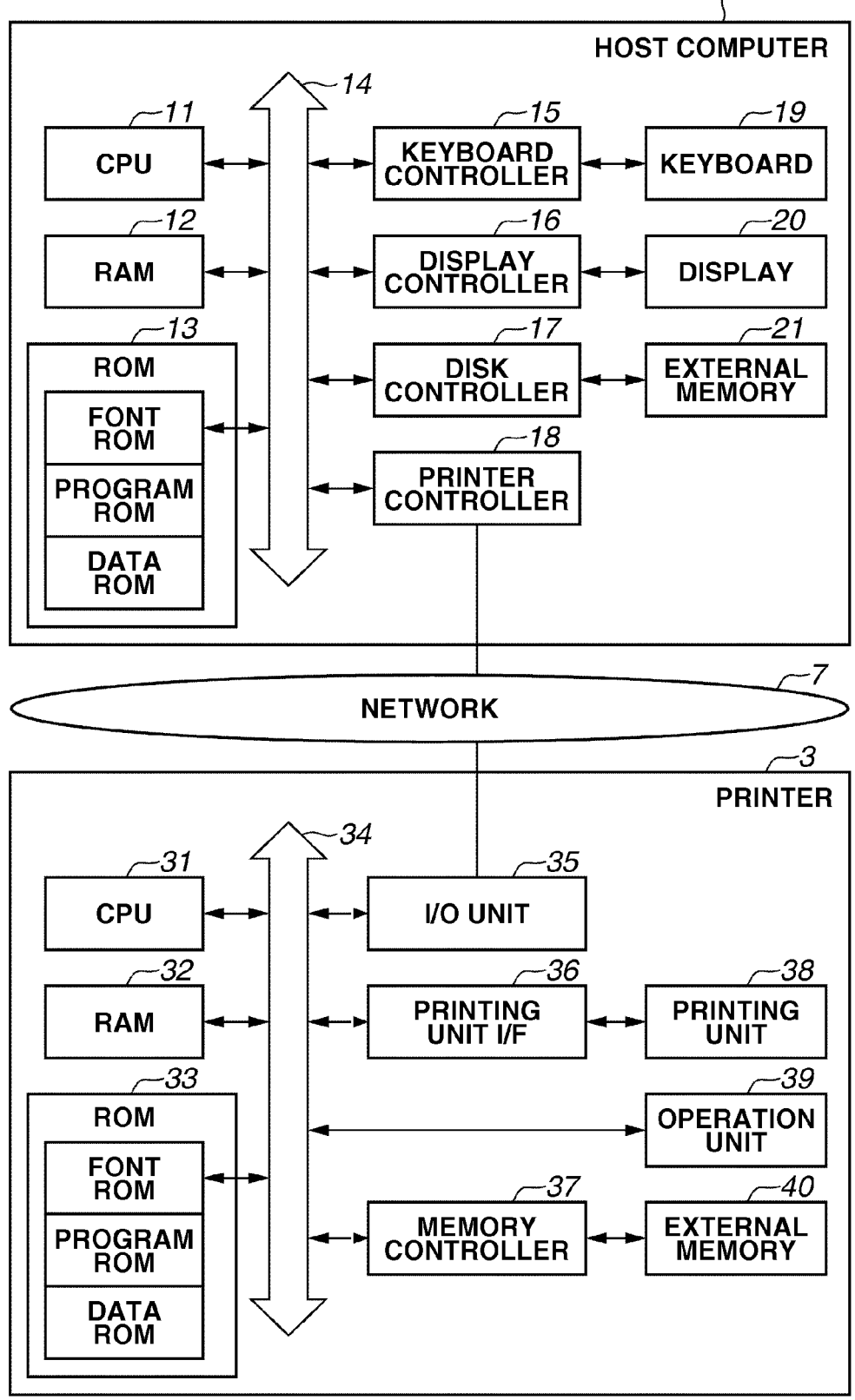
FIG. 1 is a block diagram illustrating an example hardware configuration of a host computer and a printer.

FIG. 1 is a block diagram illustrating an example hardware configuration of a print control system according to the present exemplary embodiment.

Referring to FIG. 1, a host computer 1 includes a central processing unit (CPU) 11, a random access memory (RAM) 12, a read-only memory (ROM) 13, a system bus 14, and a keyboard controller 15. In addition, the host computer 1 includes a display controller 16, a disk controller 17, a printer controller 18, a keyboard 19, a display 20, and an external memory 21.

The CPU 11 controls the execution of document processing and print processing, which is executed according to the document processing, according to a document processing program stored on a program ROM included in the ROM 13 or the external memory 21. In the present exemplary embodiment, the "document processing" refers to processing on a document in which a graphic, an image, a text, and a table (including a spreadsheet) are mixedly included.

The CPU 11 controls devices connected to the system bus 14. The RAM 12 functions as a main memory and a work area of the CPU 11.

The ROM 13 includes a program ROM, a font ROM, and a data ROM. An operating system (OS), which is a control program executed by the CPU 11, is stored on the program ROM included in the ROM 13 or on the external memory 21.

In addition, font data used for the document processing is stored on the font ROM of the ROM 13 or on the external memory 11. In addition, various data used in the document processing is stored on the data ROM included in the ROM 13 or on the external memory 11.

The CPU 11, the RAM 12, the ROM 13, the keyboard controller 15, the display controller 16, the disk controller 17, and the printer controller 18 are connected to the system bus 14.

The keyboard controller 15 controls a key input executed by a user by operating the keyboard 19 or a pointing device (not illustrated). The display controller 16 controls a display by the display 20. The disk controller 17 controls an access to the external memory 21.

As the external memory 11, a hard disk or a Floppy® disk configured to store a boot program, various applications, font data, a user file, a file to be edited, and a printer control command generation program can be used.

The printer controller 18 is connected to a printer 3 via a network 7. The printer controller 18 controls a communication with the printer 3. The CPU 11 opens various previously registered windows and executes various data processing according to a command input by operating a mouse cursor (not illustrated) displayed on a display 10.

In executing printing, the user opens a window for executing print setting, and can execute a setting of the printing, such as a printer setting and the selection of a printing mode via the print setting window.

The printer 3, which is an image processing apparatus, includes a CPU 31, a RAM 32, a ROM 33, a system bus 34, an input/output (I/O) unit 35, a printing unit interface 36, a memory controller 37, a printing unit 38, an operation unit 39, and an external memory 40.

The CPU 31 controls the entire operation of the printer 3. The CPU 31 inputs an image signal, i.e., print output information, to the printing unit 38 via the printing unit I/F 36 according to a control program stored on the ROM 33 or the external memory 40. In the following description, the printing unit 38 is also referred to as a "printer engine".

The RAM 32 functions as a main memory and a work area of the CPU 32. In addition, by using an option RAM, which can be connected to an expansion port (not illustrated), the memory capacity of the RAM 32 can be expanded. The RAM 32 is used as an output information rasterization region, an environmental data storage region, or a non-volatile random access memory (NVRAM). The ROM 33 includes a font ROM, a program ROM, and a data ROM.

Font data used for generating print output information is stored on the font ROM of the ROM 33. A control program executed by the CPU 31 is stored on the program ROM of the ROM 33. In addition, if the printer 3 does not include an external memory 44, such as a hard disk, the data ROM of the ROM 33 stores various information used in processing executed by the printer 3.

The CPU 31, the RAM 32, the ROM 33, the I/O unit 35, the printing unit I/F 36, the memory controller 37, and the operation unit 39 are connected to the system bus 34.

The I/O unit 35 is constituted by a network card. The CPU 31 transmits and receives data between the printer 3 and the host computer 1 via the I/O unit 35 and the network 7. By executing the above-described data communication between the printer 3 and the host computer 1, information about the printer 3 can be notified from the printer 3 to the host computer 1.

The printing unit I/F 36 is an interface between the CPU 31 and the printing unit 38. The memory controller 37 controls an access to the external memory 40. The printing unit 38 forms an image on a sheet based on an image signal input by the CPU 31 via the printing unit I/F 36. In addition, the printing unit 38 fixes the image on the sheet by using a fixing device, and outputs the resulting image.

The operation unit 39 executes processing according to a user operation. The operation unit 39 includes an operation panel. In addition, the operation unit 39 includes a switch used for executing a user operation and a light-emitting diode (LED) display device. In the present exemplary embodiment, the printer 3 includes an NVRAM (not illustrated). The NVRAM of the printer 3 can store printer mode setting information input by 22.

The external memory 40 is constituted by a hard disk or an integrated circuit (IC) card. The external memory 40 is connected as an optional device. Furthermore, the external memory 40 stores font data, an emulation program, and form data.

Figure 2:
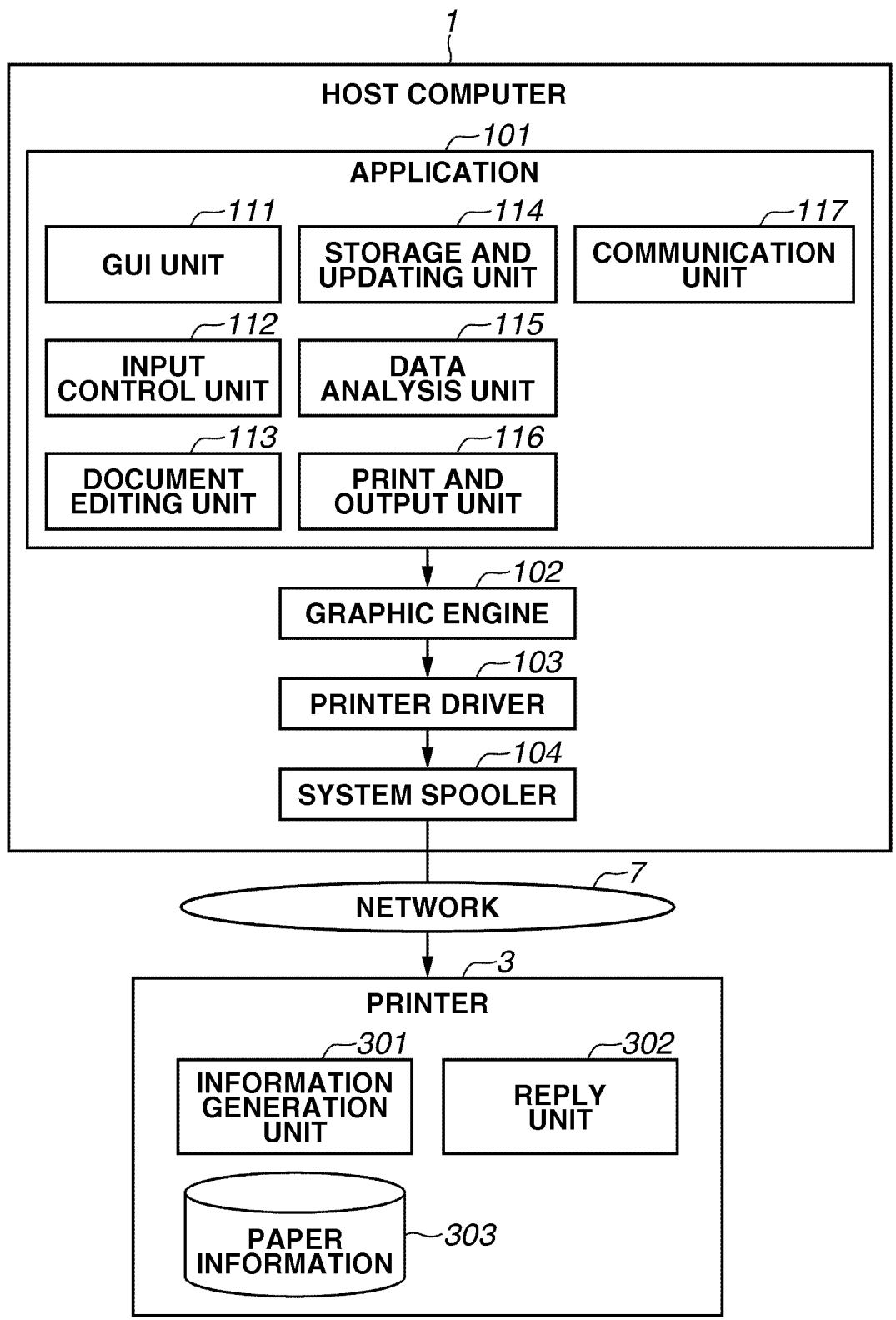
FIG. 2 is a block diagram illustrating an example software configuration of a print control system.

FIG. 2 is a block diagram illustrating an example software configuration of the print control system according to the present exemplary embodiment.

Referring to FIG. 2, the host computer 1 includes an application 101, a graphics engine 102, a printer driver 103, and a system spooler 104.

The application 101, the graphics engine 102, the printer driver 103, and the system spooler 104 exist as files stored on the external memory 21 illustrated in FIG. 1. The application 101, the graphics engine 102, the printer driver 103, and the system spooler 104 are program modules loaded and executed by the OS or a module that utilizes the program modules on the RAM 12.

In addition, the application 101 and the printer driver 103 can be added and stored to the hard disk included in the external memory 21 via a Floppy® disk of the external memory 21, a compact disc-read only memory (CD-ROM) (not illustrated), or a network (not illustrated).

The application 101 is displayed on the display 20 of the host computer 1. A graphic user interface (GUI) module 111 receives an input executed via an input device, such as a keyboard or a mouse. An input control unit 112 detects a user operation of the keyboard 19 via the GUI module 111. In addition, the input control unit 112 instructs the editing of the document and the storage of a file according to the input user operation.

A document editing unit 113 controls various document editing processing, which is executed on document data currently being edited by the application 101 according to an editing instruction input by the input control unit 112. A storage and updating unit 114 instructs the storage and updating of document data and printer information according to the editing instruction input by the input control unit 112.

A data analysis unit 115 is configured to analyze document data and printer information to generate drawing data, which includes transparent toner drawing data, according to a result of the analysis and under control of the document editing unit 113. A print and output unit 116 is configured to print the document data currently being edited by the application 101 under control of the document editing unit 113. A communication unit 117 communicates with the printer 3 via the network 7.

The application 101 loads document data from the external memory 21 onto the RAM 12, and provides a function to the user for editing the loaded document data. The document data can have a format uniquely provided within the document processing system. Alternatively, a data file generated by a general application can be converted into a unique format and the converted data file having the unique format can be used as the document data. The document data will be described in detail below with reference to FIG. 9.

Figure 3:
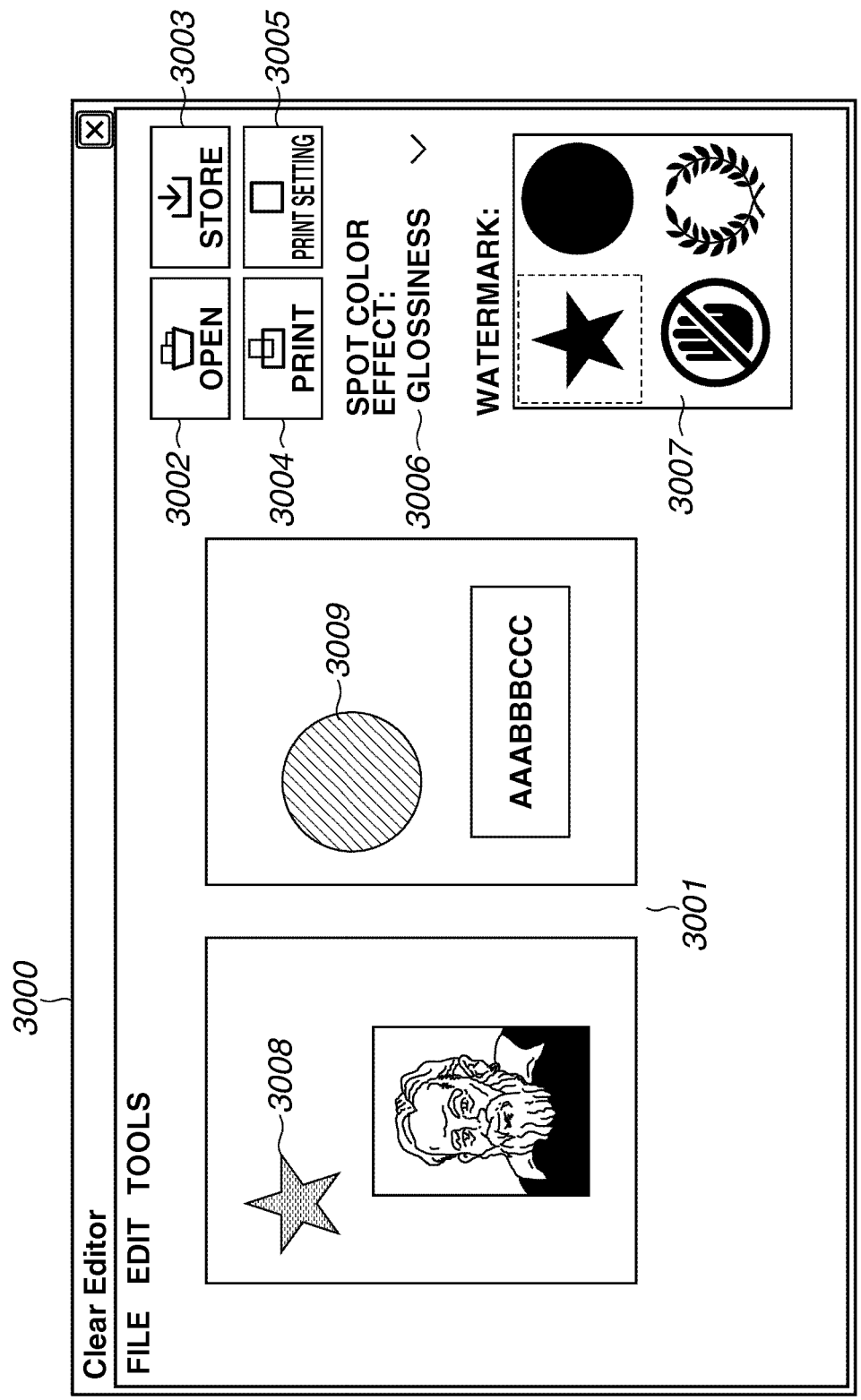
FIG. 3 illustrates an example user interface displayed on a main window.

FIGS. 3 and 4 illustrate the GUI module 111 of the application 101. The GUI module 111 is constituted by a main window 3000, a print setting dialog 4000, and an inverse drawing setting dialog 5000.

Referring to FIG. 3, a content of document data is displayed in the display field 3001. By pressing an "open button" 3002, the user can select document data to be edited. By pressing a "store" button 3003, the user can store the currently edited document data.

By pressing a print button 3004, the user can execute printing of the currently edited document data. In addition, when a print setting button 3005 is pressed by the user, the print setting dialog 4000 is displayed. The user can execute a various settings, such as two-sided printing, binding printing, and the paper size.

When an "OK" button is pressed via the print setting dialog 4000, processing for changing the print setting is started. The print setting changing processing will be described in detail below with reference to the flow charts of FIGS. 5 and 6.

A spot color effect field 3006 is a field for setting a spot color effect which can be expressed by applying the transparent toner. The spot color effect at least includes "glossy" and "matte". A stamp object field 3007 displays a stamp object having an annotation format. The user can designate a portion of an image on which the transparent toner is to be applied via the stamp object field 3007. In addition, the user can execute the setting to the stamp object field 3007 by operating the keyboard 19.

More specifically, a stamp object can be positioned at an arbitrary position 3008 or 3009. For the setting of applying the transparent toner, in addition to a setting for positioning a stamp object at a specific position, a template can be used, which instructs the decoration of the entire image region.

The inverse drawing setting dialog 5000 is displayed when the user selects a control (not illustrated), such as a menu item, via the main window 3000. The inverse drawing setting dialog 5000 will be described in detail below with reference to FIG. 15. For a portion of an image instructed by the user to print the portion by using the transparent toner, a setting for executing printing without using the transparent toner via the inverse drawing setting dialog 5000.

On the other hand, for a portion of an image instructed by the user to print the portion without using the transparent toner, an inverse drawing setting, which is a setting for inverting the data, can be executed to execute printing by using the transparent toner. The "inverse drawing" refers to inverting the portion designated to execute drawing thereon by using the transparent toner and the portion designated not to execute drawing, as illustrated in FIG. 17 (hereinafter referred to as "negative/positive inversion").

Referring to FIG. 17, in an image 1701, the drawing is executed by using the transparent toner on a portion thereof except a portion at which an object 1703 is positioned. By executing the negative/positive inversion on the image 1701, the image is drawn by using the transparent toner only on the portion thereof at which an object 1704 is positioned, as illustrated in FIG. 17 as an image 1702.

Figure 15:
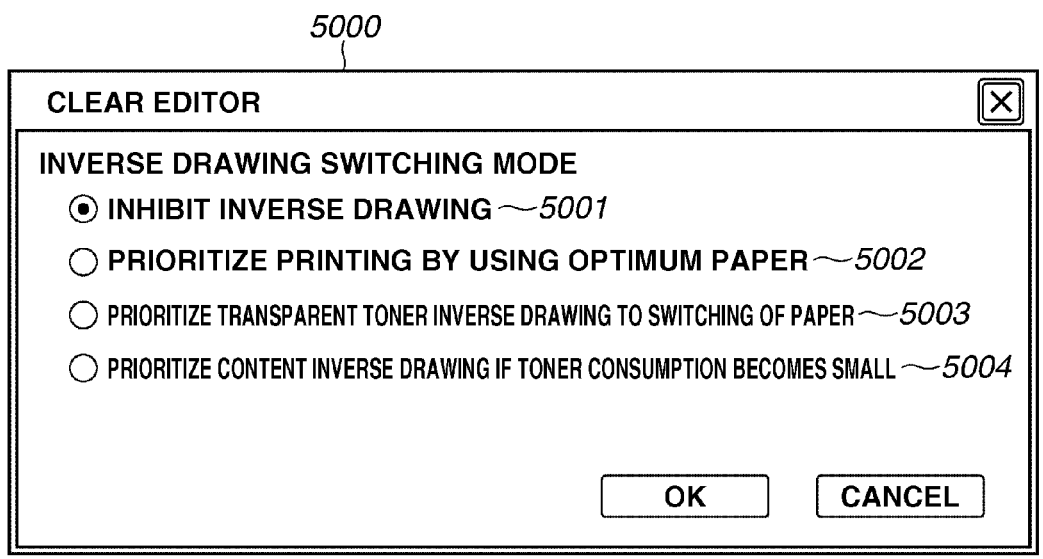
FIG. 15 illustrates an example user interface used for executing a setting of inverse drawing.

In setting the negative/positive inversion, the user can select either one of inverse drawing modes 5001 through 5004 illustrated in FIG. 15. Referring to FIG. 15, if the mode 5001 is selected by the user, the negative/positive inversion is not to be executed. On the other hand, if the mode 5002 is selected by the user, the negative/positive inversion is not to be executed if an optimum paper exists. Furthermore, if the mode 5003 is selected by the user, the inverse drawing is executed if the paper is not to be switched by executing the negative/positive inversion. In addition, if the mode 5004 is selected by the user, the negative/positive inversion is to be executed if the amount of consumption of the transparent toner can be reduced by executing the negative/positive inversion.

The setting value is stored on the external memory 21 as a setting file of the application 101. When the setting value is referred to, the setting value is loaded onto the RAM 12. The setting can be previously determined by the user.

The graphics engine 102 is loaded and executed on the RAM 12 like the application 101. The printer driver 103 is configured to convert an output of the application 101 into a control command of a printer that executes the printing. The control command is a command for instructing the printing of print data generated by the graphics engine 102.

The printer driver 103 is provided to each printer connected to the host computer 1 via the network 7. The printer driver 103 is loaded and executed from the CPU 11 on the RAM 12.

The system spooler 104 is configured to output a printer control command converted by the printer driver 103 to the printer designated to execute the printing via the network 7. When the printer control command is received, the printer executes the printing. The system spooler 104 is also loaded and executed on the RAM 12 illustrated in FIG. 2.

Referring to FIG. 2, the printer 3 includes a paper information generation unit 301, a paper information reply unit 302, and a paper information storage unit 303. The paper information generation unit 301 generates paper information. In addition, the paper information generation unit 301 stores the generated paper information on the paper information storage unit 303. The paper information at least includes a characteristic of a front surface or a back surface of the sheet set to the paper feed stage included in the printer 3. In the following description, the characteristic of the front surface or the back surface of the sheet will be referred to as a "surface attribute".

The printer information reply unit 302 of each paper feed stage transmits printer information to the communication unit 117 of the host computer 1 according to a printer information acquisition request from the communication unit 117. The printer information transmitted by the paper information reply unit 302 at least includes the information stored on the paper information storage unit 303.

The printing control method according to the present exemplary embodiment is implemented by processing executed by the host computer 1, which is included in the print control system illustrated in FIG. 2.

<Data Structure>

Figure 9:
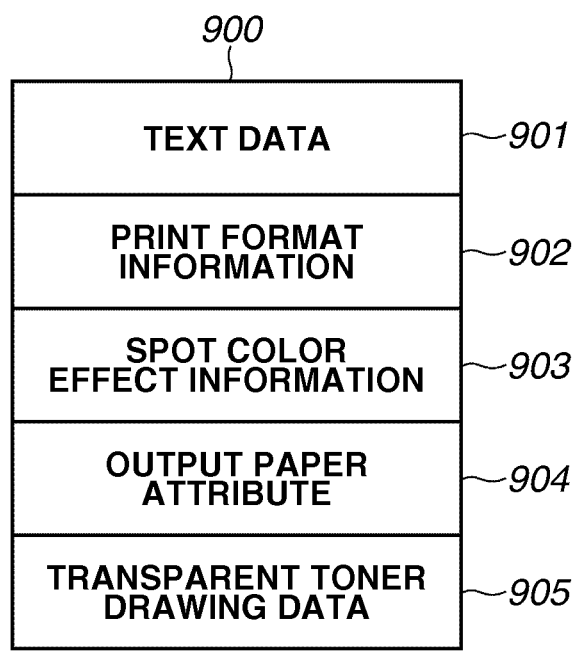
FIG. 9 illustrates example document data.

FIG. 9 illustrates an example document data. As described above, the document data is stored on the external memory 21, and is loaded by the application 101 onto the RAM 12.

Referring to FIG. 9, an application text data 901 of document data 900 includes a page (logical page) constituting the document and a drawing content. The logical page is a page set as data of one page in the text data 901 before imposition is executed to the output paper. On the other hand, a physical page refers to a physical page to be actually imposed on the output paper on one surface of the sheet.

The print format information 902 includes print setting information selected by the user via the print setting dialog 4000 and page layout information, which is information about the layout of each logical page according to the print setting. Suppose, for example, that 2-in-1 printing and two-sided printing have been designated by the user as print setting information about document data including four logical pages.

In this case, at least information including an instruction for allocating first and second logical pages onto the first physical page (the front surface) of the output sheet and allocating third and fourth logical pages onto the second physical page (the back surface) of the output sheet is included in the print format information 902.

Spot color effect information 903 is information about an object provided with the spot color effect set by the user via the spot color effect field 3006. For example, the spot color effect information 903 at least includes a page number of the logical page in which an object to which the spot color effect has been set is positioned, drawing data (coordinates) of the object, and the set spot color effect (glossy or matte effect).

An output paper attribute 904 stores a paper attribute necessary in printing each physical page of the document data. Transparent toner drawing data 905 stores a content to be drawn by using the transparent toner in printing each physical page of the document data.

Figure 10:
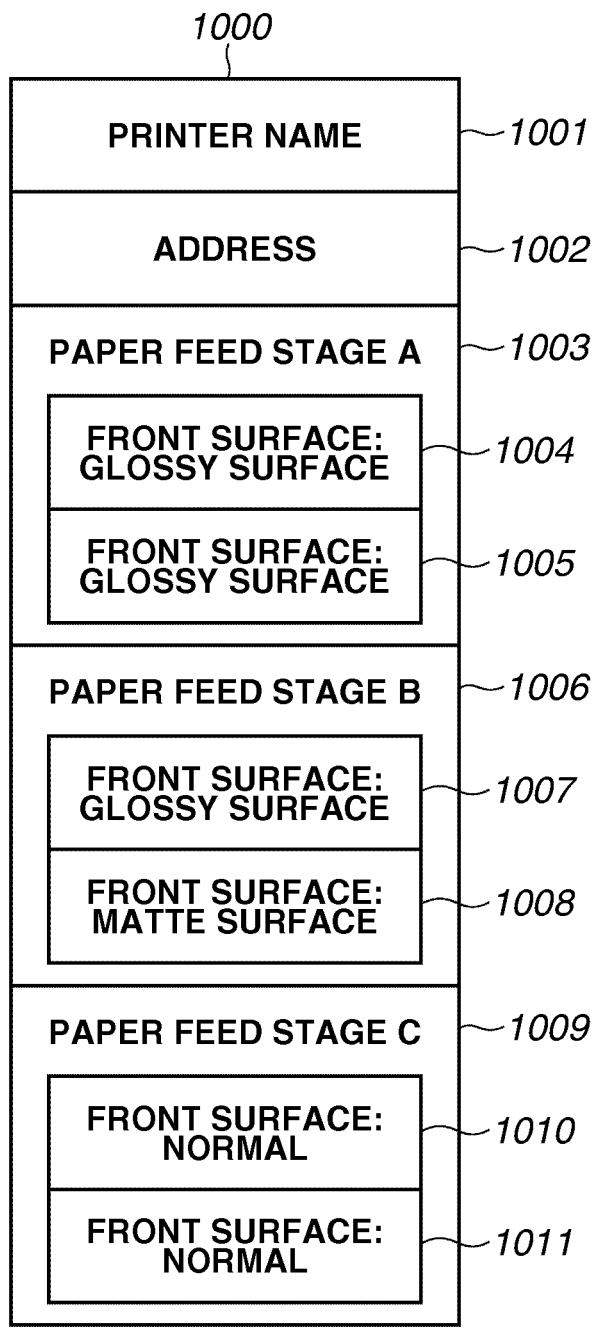
FIG. 10 illustrates example printer information.

FIG. 10 illustrates an example of printer information. Referring to FIG. 10, printer information 1000 can store information about one printer that is currently set as a printer used in executing printing by using the print and output unit 116. Alternatively, the printer information 1000 can store printer information about each of a plurality of printers on the network. A printer name portion 1001 stores the name of a printer.

An address portion 1002 stores an address of the printer on the network 7. Each of portions 1003 through 1005, 1006 through 1008, and 1019 through 1011 stores paper feed stage information, which is information about a sheet set to the paper feed stage provided in the printer. The communication unit 117 acquires and stores the paper attributes at an arbitrary timing before executing the printing at the latest.

Each paper feed stage information at least stores a sheet front surface attribute and a sheet back surface attribute 1004 and 1005 (FIG. 10). In the example illustrated in FIG. 10, a sheet whose front surface has a glossy attribute and whose back surface has a matte attribute is set to the paper feed stage B.

<Operation Executed in Changing the Print Setting>

Figure 5:
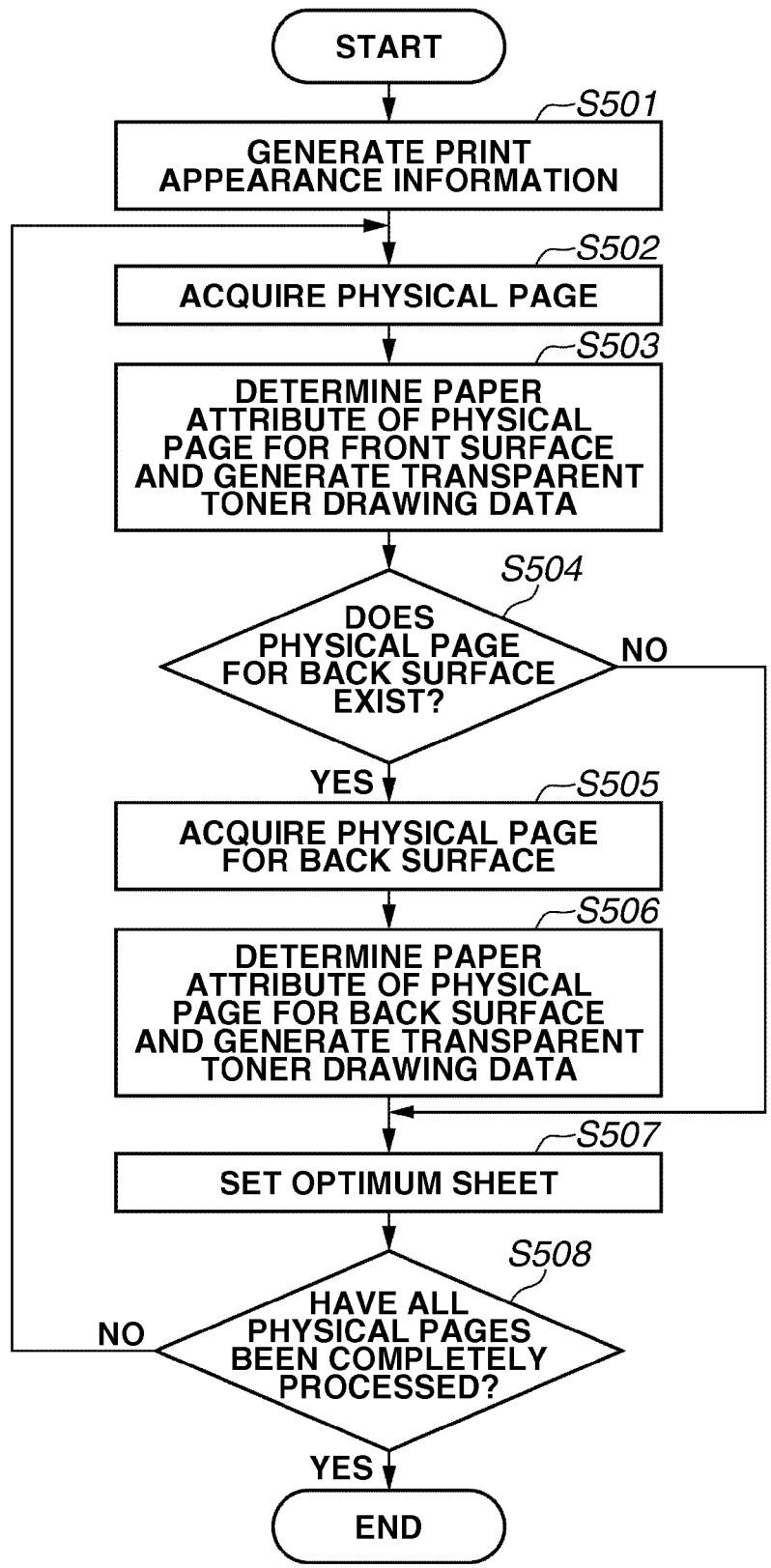
FIG. 5 is a flow chart illustrating an example flow of processing for changing a print appearance.

FIG. 5 is a flow chart illustrating an example flow of processing for changing a print setting. In the present exemplary embodiment, the processing illustrated in FIG. 5 is executed when the print setting is changed. However, the processing illustrated in FIG. 5 can be applied if a resulting product is changed by adding a page to the document data or by changing the spot color effect.

If the user changes the print setting via the print setting dialog 4000 of the GUI module 111 included in the application 101 of the host computer 1, then the application 101 starts the print setting changing processing illustrated in FIG. 5.

Referring to FIG. 5, in step S501, the document editing unit 113 generates print format information 902. In step S502, the data analysis unit 115 refers to and acquires the print format information 902. In addition, the data analysis unit 115 acquires a first physical page that has not been processed yet.

In step S503, the data analysis unit 115 determines the paper attribute of the physical page (the paper attribute of the front surface of the output paper) and generates transparent toner drawing data to be printed using the transparent toner. The processing in step S503 will be described in detail below with reference to FIG. 6.

In step S504, the data analysis unit 115 refers to the print format information 902 to determine whether any physical page to be allocated on the back surface of the physical page acquired in step S501 exists. If it is determined that a physical page to be allocated on the back surface of the acquired physical page exists (Yes in step S504), then the processing proceeds to step S505. On the other hand, if it is determined that no physical page to be allocated on the back surface of the acquired physical page exists (No in step S504), then the processing proceeds to step S507.

In step S505, the data analysis unit 115 refers to the print format information 902, and acquires one physical page to be allocated on the back surface of the physical page acquired in step S501. Subsequently, in step S506, the data analysis unit 115 determines the paper attribute of the physical page (the paper attribute of the back surface of the output paper) and generates the transparent toner drawing data. Processing in step S506 is similar to the processing in step S503.

In step S507, the document editing unit 113 determines an optimum sheet for the output sheet including the physical page acquired in steps S502 and S505, and determines an attribute of the output paper. The result of the determination is stored in the output paper attribute 904.

A sheet whose front surface has the paper attribute determined in step S503 and whose back surface has the paper attribute determined in step S506 is determined to be the optimum sheet.

In step S508, the data analysis unit 115 determines whether all the physical pages have been completely processed. If it is determined that not all the physical pages have been completely processed (No in step S508), then the processing proceeds to step S502. On the other hand, if it is determined that all the physical pages have been completely processed (Yes in step S508), then the processing ends.

By executing the processing illustrated in FIG. 5, an optimum output sheet having the paper attribute that sufficiently satisfies the print conditions, such as the designated print setting and the spot color toner effect, can be automatically set. In addition, transparent toner drawing data can be generated according to the automatically selected optimum sheet.

Figure 6:
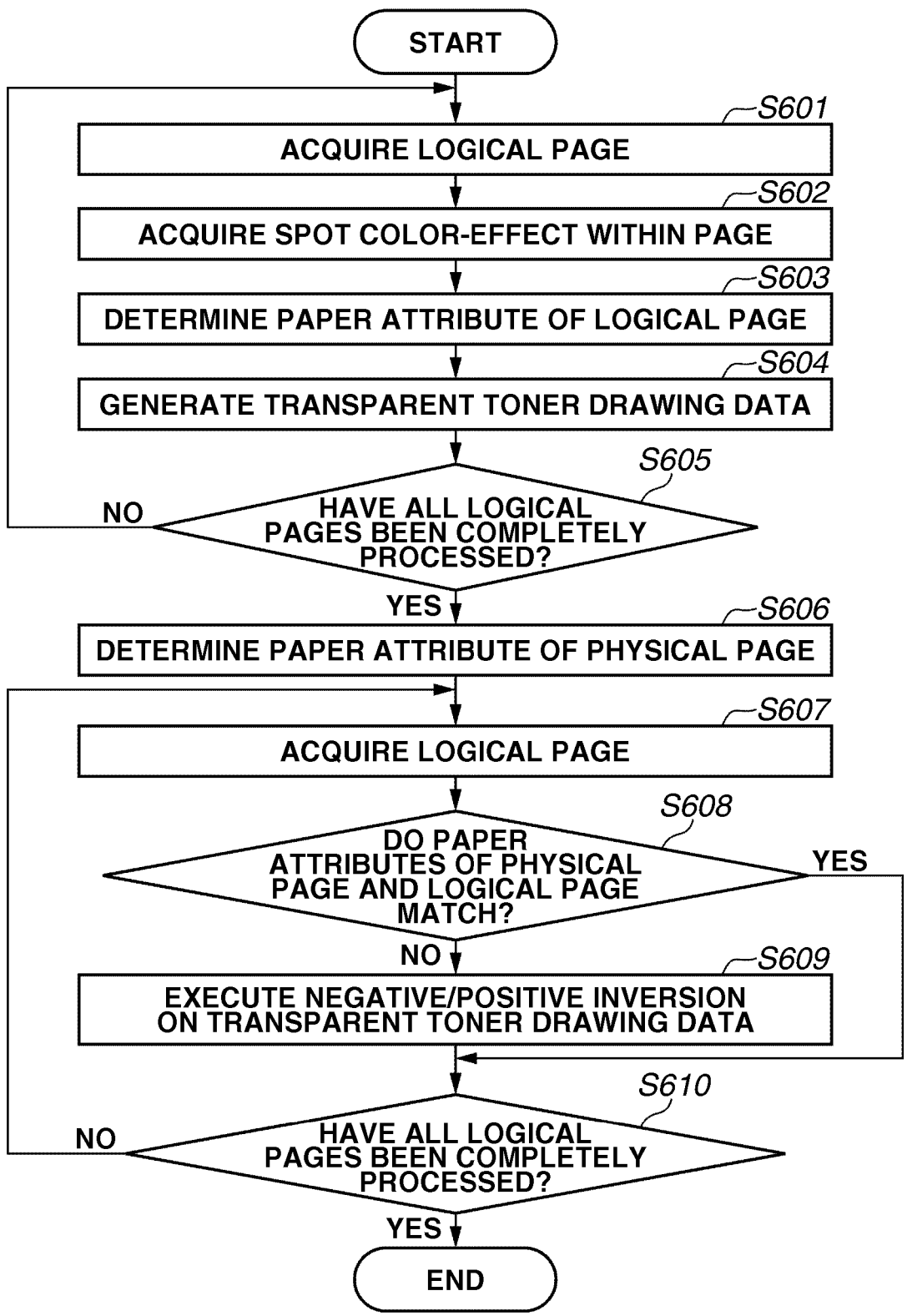
FIG. 6 is a flow chart illustrating an example flow of processing for determining a paper attribute, which is executed in changing a print appearance.

FIG. 6 illustrates the details of the processing in steps S503 and S506 illustrated in FIG. 5. Each step of the processing illustrated in FIG. 6 is executed by the data analysis unit 115.

Referring to FIG. 6, in step S601, the data analysis unit 115 refers to the print format information 902, and acquires one logical page included in the physical page acquired in step S502 (or step S505). In step S602, the data analysis unit 115 refers to the spot color effect information 903 and acquires the spot color effect included in the logical page acquired in step S601.

In step S603, the data analysis unit 115 determines the paper attribute for implementing the spot color effect acquired in step S602. In step S604, according to the determined paper attribute, the data analysis unit 115 generates the transparent toner drawing data 905 of the logical page.

In step S605, the data analysis unit 115 determines whether all the logical pages included in the physical page have been completely processed. If it is determined that not all the logical pages included in the physical pages have been completely processed (No in step S605), then the processing proceeds to step S601. On the other hand, if it is determined that all the logical pages included in the physical pages have been completely processed (Yes in step S605), then the processing proceeds to step S606.

In step S606, the data analysis unit 115 determines the paper attribute of the physical page based on the paper attribute of the logical page determined in step S603. In the present exemplary embodiment, a paper attribute of the first logical page can be determined to be the paper attribute of the physical page. Alternatively, the paper attribute of the logical page that is the most frequently set paper attribute can be used as the paper attribute of the physical page. More specifically, if the print appearance is "2-in-1" and if the paper attribute of the first logical page is different from the paper attribute of the second logical page, the paper attribute of the first logical page can be set as the paper attribute of the physical page.

In step S607, the data analysis unit 115 acquires the logical page included in the physical page whose paper attribute has been determined again. In step S608, the data analysis unit 115 determines whether the paper attribute of the logical page determined in step S603 and the paper attribute of the physical page determined in step S608 match.

If it is determined that the paper attributes match with each other (Yes in step S608), then the processing proceeds to step S610. On the other hand, if it is determined that the paper attributes do not match with each other (No in step S608), then the processing proceeds to step S609. In step S609, the data analysis unit 115 executes the negative/positive inversion on the transparent toner drawing data 905 of the logical page.

In step S610, the data analysis unit 115 determines whether all the logical pages have been completely processed. If it is determined that not all the logical pages have been completely processed (No in step S610), then the processing proceeds to step S607. If it is determined that all the logical pages have been completely processed (Yes in step S610), then the processing ends.

<Operation Executed for Printing>

FIG. 7 is a flow chart illustrating an example flow of print processing. If the print button 3004 is pressed by the user via the main window 3000 of the GUI module 111 included in the application 101 of the host computer 1, the application 101 starts the print processing.

Referring to FIG. 7, in step S701, the communication unit 117 acquires paper information from the paper information storage unit 303 via the network 7 and stores the acquired paper information in the printer information 1000. In step S702, the data analysis unit 115 refers to the document data 900 and acquires the output paper attribute 904.

In step S703, the data analysis unit 115 refers to the document data 900. In addition, the data analysis unit 115 calculates a number n, which is the number of the printing sheets. Furthermore, the data analysis unit 115 sets the printing sheet quantity n as a current processing target sheet number (i=1). In step S704, the data analysis unit 115 refers to the output paper attribute 904 and acquires an attribute of a first optimum sheet (i-th sheet) yet to be processed.

In step S705, the data analysis unit 115 determines an i-th output sheet and generates transparent toner drawing data to be drawn on the i-th sheet. The processing in step S705 will be described in detail below with reference to FIG. 8.

In step S706, the print and output unit 116 sets the i-th output sheet to the printer driver 103 via the graphics engine 102. More specifically, the print and output unit 116 sets the paper feed stage to store the sheet determined in step S705.

In step S707, the data analysis unit 115 transmits, to the printer driver 103 via the graphics engine 102, text drawing data corresponding to the text data for the i-th sheet and the drawing data necessary for executing printing by using the transparent toner.

After receiving the text drawing data and the transparent toner drawing data, the printer driver 103 converts the received drawing data into a control command compliant with the format of the printer that has been set to execute the printing. In addition, the printer control command is transmitted to the printer 3 via the system spooler 104. After receiving the printer control command, the printer 3 executes the printing according to the received control command.

In step S708, the data analysis unit 115 determines whether the drawing data of all the pages (i.e., all drawing data to be printed on the sheets) have been completely transmitted. If the transmission of the drawing data of all the pages has not been completed yet (No in step S708), then the processing proceeds to step S709. On the other hand, if it is determined that the transmission of the drawing data of all the pages has been completed (Yes in step S708), then the print processing ends. In step S709, the data analysis unit 115 substitutes the processing target sheet number "i" with "(i+1)". To paraphrase this, in step S709, the data analysis unit 115 sets the next paper as the sheet to be processed.

Figure 8B:
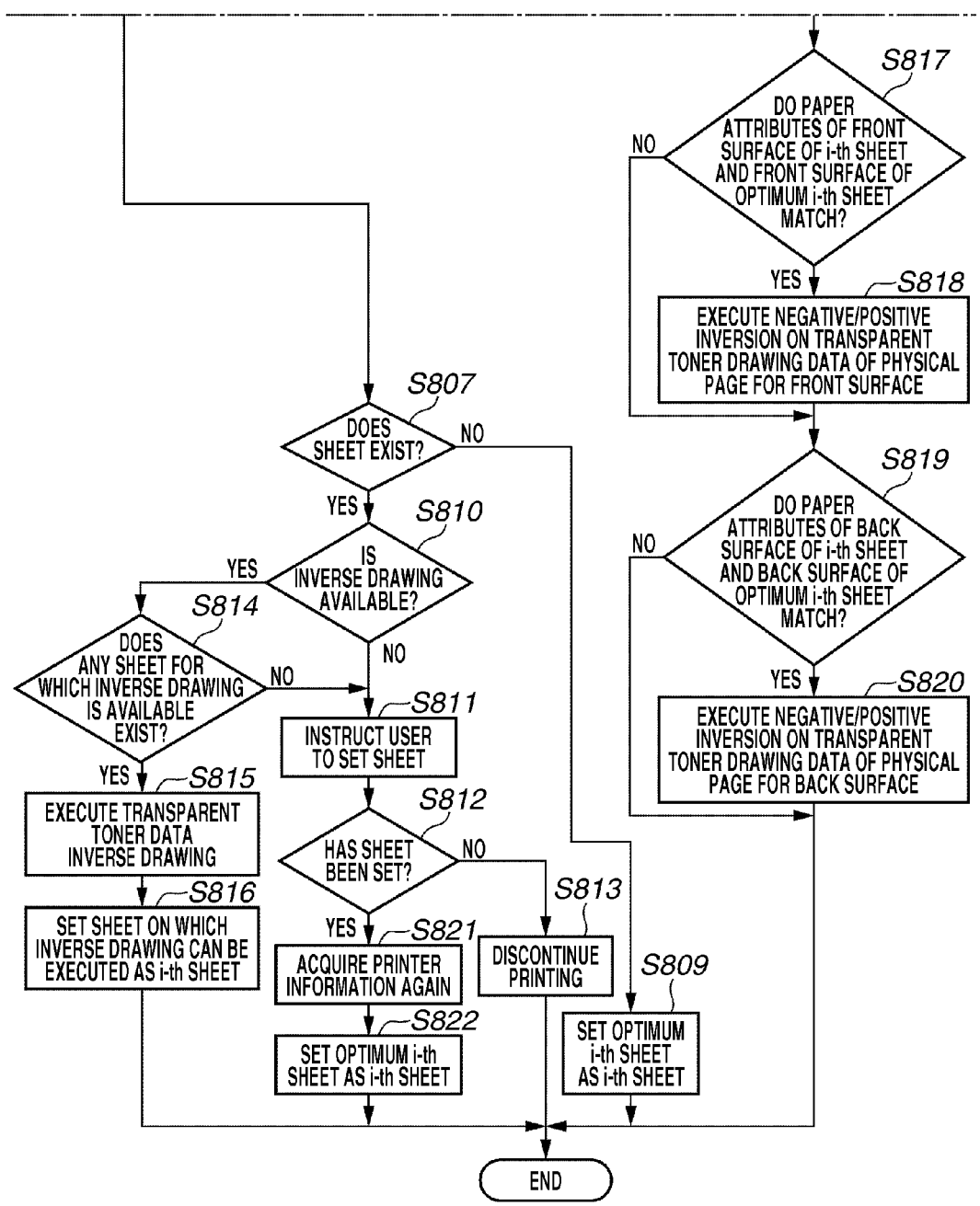
FIGS. 8 (8A and 8B) is a flow chart illustrating an example flow of processing for determining an output paper, which is executed in print processing.

FIGS. 8 (8A and 8B) illustrates the processing in step S705 illustrated in FIG. 7 in detail.

Each step of the processing illustrated in FIG. 8 is executed by the data analysis unit 115. Referring to FIG. 8, in step S801, the data analysis unit 115 refers to a setting for the inverse drawing that has been set by the user via the inverse drawing setting dialog 5000, and determines what inverse drawing mode is currently set.

If it is determined that the inverse drawing has been inhibited (the mode 5001 illustrated in FIG. 15) or that the optimum sheet priority mode 5002 has been currently set ("inverse drawing-inhibited mode or optimum sheet priority mode" in step S801), then the processing proceeds to step S807. On the other hand, if it is determined that the sheet switching priority mode (the mode 5003 illustrated in FIG. 15) has been set as the inverse drawing mode ("sheet switching priority mode" in step S801), then the processing proceeds to step S802. Furthermore, if it is determined that the transparent toner consumption amount priority mode (i.e., the mode 5004 illustrated in FIG. 15) has been set as the inverse drawing mode ("transparent toner consumption amount priority mode" in step S801), then the processing proceeds to step S805.

If the processing has proceeded to step S802 because the sheet switching priority mode (the mode 5003 illustrated in FIG. 15) has been set as the inverse drawing mode, the data analysis unit 115 acquires the paper attribute of the output sheet that is previous to the i-th sheet, which is the sheet used in the current processing (i.e., an (i−1)-th sheet).

In step S803, the data analysis unit 115 refers to the spot color effect information 903 and determines whether the spot color effect for the i-th sheet can be implemented according to the paper attribute set to the (i−1)-th sheet. If it is determined that the spot color effect for the i-th sheet can be implemented (Yes in step S803), then the processing proceeds to step S804. If the spot color effect for the i-th sheet cannot be implemented (No in step 803), then the processing proceeds to step S807.

In step S804, the data analysis unit 115 sets the same sheet as the (i−1)-th output paper, as the i-th output paper. If the processing has proceeded to step S805 because the transparent toner consumption amount priority mode (i.e., the mode 5004 illustrated in FIG. 15) has been set as the inverse drawing mode, then the data analysis unit 115 refers to the spot color effect information 903 and the paper feed stage information included in the printer information 1000.

In addition, the data analysis unit 115 selects a sheet with which the spot color effect designated to the i-th data, among i-th sheets in each paper feed stage, can be implemented. Furthermore, the data analysis unit 115 calculates the consumption amount of the transparent toner to be used in the printing.

In step S806, the data analysis unit 115 sets the output paper whose transparent toner consumption amount calculated in step S805 is the smallest as the i-th output sheet.

If it is determined that the inverse drawing has been inhibited (the mode 5001 illustrated in FIG. 15) or that the optimum sheet priority mode 5002 has been currently set or if it is determined that drawing cannot be executed on the (i−1)-th sheet (No in step S803), then the processing proceeds to step S807. In step S807, the data analysis unit 115 refers to the paper feed stage information included in the printer information 1000 to determine whether any i-th sheet having the optimum paper attribute exists on the printer 3.

If it is determined that any i-th sheet having the optimum paper attribute exists on the printer 3 (Yes in step S807), then the processing proceeds to step S809. On the other hand, if it is determined that no i-th sheet having the optimum paper attribute exists on the printer 3 (No in step S 807), then the processing proceeds to step S810. In step S809, the data analysis unit 115 sets the i-th optimum sheet as the i-th output sheet.

In step S810, the data analysis unit 115 refers to the inverse drawing setting and determines whether the inverse drawing has been permitted in the setting. If it is determined that the inverse drawing has been permitted in the setting (Yes in step S810), then the processing proceeds to step S814. On the other hand, if it is determined that the inverse drawing has not been permitted in the setting (No in step S810), then the processing proceeds to step S811.

Figure 16A:
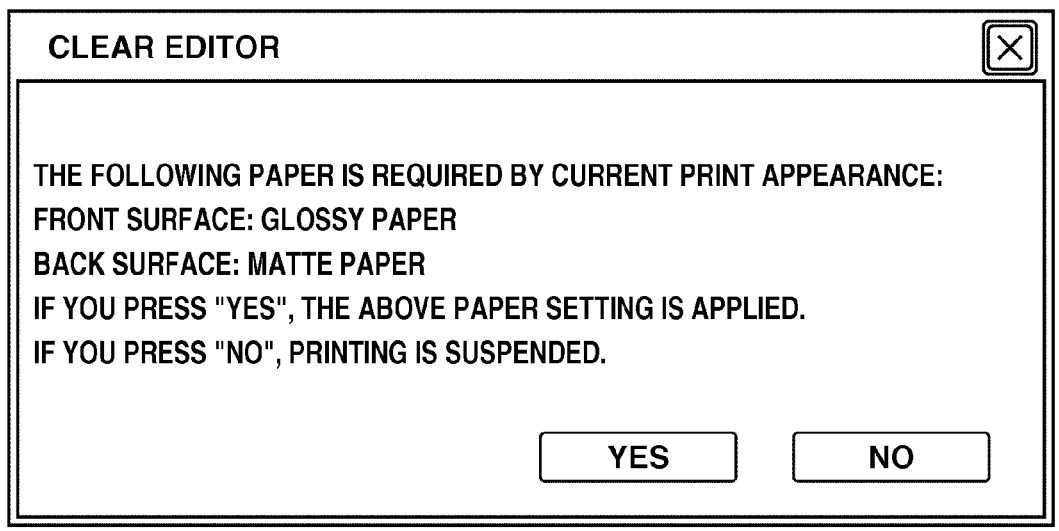
FIGS. 16A and 16B illustrate an example user interface for instructing a user to insert a sheet into a paper feed stage.
Figure 16B:
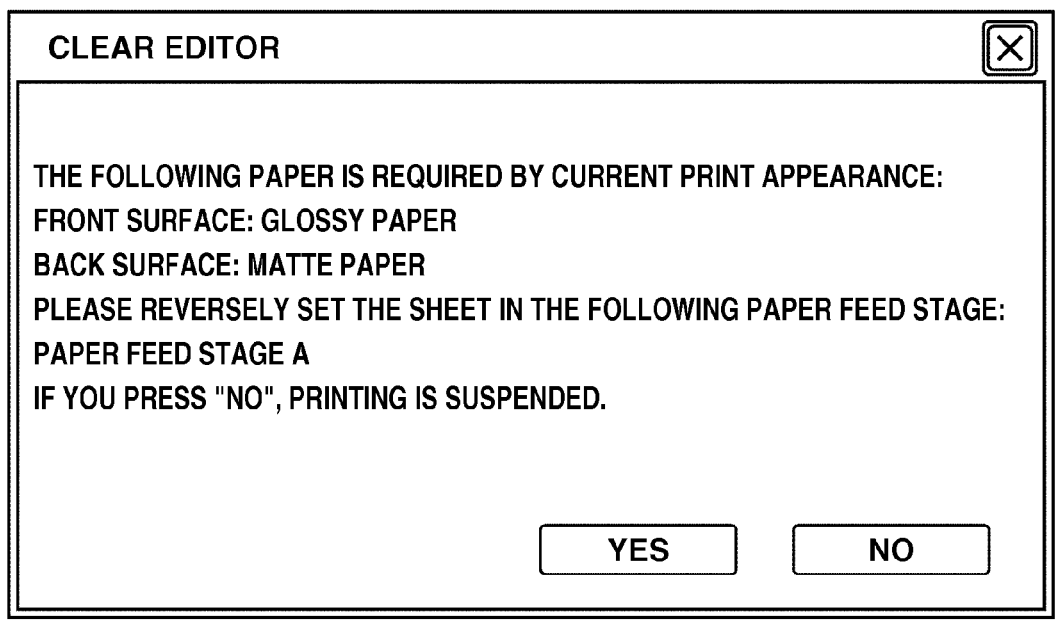

In step S811, the data analysis unit 115 displays a message box indicating a message such that it is necessary for the user to insert a sheet into the paper feed stage of the printer 3 illustrated in FIG. 16A. The message is displayed via the GUI module 111. The message box displayed in step S811, if any paper feed stage currently storing sheets set in the reverse orientation exists on the printer 3, the message box indicating a message such that it is necessary for the user to set the sheet in the correct orientation illustrated in FIG. 16B can be displayed.

In step S812, if button "Yes" has been pressed by the user via the message box displayed in step S811 (Yes in step S812), then the processing proceeds to step S821. On the other hand, if it is determined that button "No" has been pressed by the user via the message box displayed in step S811 (No in step S812), then the processing proceeds to step S813.

In step S813, the data analysis unit 115 suspends the print processing. Then the processing ends. In step S821, the data analysis unit 115 acquires the printer information via the communication unit 117 to acquire the information about the sheet set in step S812. In addition, the data analysis unit 115 updates the information about each paper feed stage included in the printer information 1000. In step S822, the data analysis unit 115 sets the i-th output sheet as the i-th optimum sheet.

In step S814, the data analysis unit 115 refers to the printer information 1000 to determine whether any sheet on which the spot color effect set to the i-th sheet can be implemented by the negative/positive inversion exists. If it is determined that a sheet on which the spot color effect set to the i-th sheet can be implemented by the negative/positive inversion exists (Yes in step S814), then the processing proceeds to step S815. If no such sheet exists (No in step S814), then the processing proceeds to step S811.

In step S815, the data analysis unit 115 executes the negative/positive inversion on the transparent toner drawing data 905. More specifically, in step S815, the data analysis unit 115 updates the transparent toner drawing data 905 and the updated transparent toner drawing data 905 is used in the output processing in step S707 in FIG. 7. However, alternatively, transparent toner drawing data, which is associated with the transparent toner drawing data 905 and on which the negative/positive inversion is executed, can be separately generated, and can be used in the output processing in step S707.

In step S816, the data analysis unit 115 sets the i-th output sheet as the sheet determined in step S814 as can be drawn after negative/positive inversion.

In step S817, the data analysis unit 115 determines whether the attribute of the front surface of the i-th sheet and the attribute of the front surface of the i-th optimum sheet match. If it is determined that the front surface attributes match (Yes in step S817), then the processing proceeds to step S819. On the other hand, if it is determined that the front surface attributes do not match (No in step S817), then the processing proceeds to step S818. In step S818, the data analysis unit 115 executes the negative/positive inversion on the transparent toner drawing data 905 to be printed within the physical page on the front surface of the sheet.

In step S819, the data analysis unit 115 determines whether the attribute of the back surface of the i-th sheet and the attribute of the back surface of the i-th optimum sheet match. If it is determined that the back surface attributes match (Yes in step S819), then the processing ends. On the other hand, if it is determined that the back surface attributes do not match (No in step S819), then the processing proceeds to step S820. In step S820, the data analysis unit 115 executes the negative/positive inversion on the transparent toner drawing data 905 to be printed within the physical page on the back surface of the sheet.

In steps S818 and S820, the data analysis unit 115 updates the transparent toner drawing data 905. The updated transparent toner drawing data 905 is used in the output processing in step S707 in FIG. 7. Alternatively, transparent toner drawing data, which is subjected to the negative/positive inversion and associated with the transparent toner drawing data 905, can be generated and used in the output processing in step S707.

FIGS. 11, 12, 13, and 14 each illustrate an example of a combination of the output sheet and the transparent toner drawing data used when various print settings have been executed and if the processing according to the present exemplary embodiment is executed.

Referring to FIG. 11, a display state 1100 is an example display state of the document data 900 on the main window 3000. In the example illustrated in FIG. 11, the document data 900 includes the text data 901 of each of two logical pages 1101 and 1102.

In addition, the spot color effect has been set to each of objects 1103 and 1104. More specifically, the glossy effect has been set to the object 1103 as the spot color effect. The matte effect has been set to the object 1104 as the spot color effect.

Referring to FIG. 11, outputs 1105 through 1108 are output examples of types of paper and drawing data, when the document data 900 is printed using the printer 3, by one-sided printing and by using an optimum sheet for implementing the spot color effect.

The output 1105 is a transparent toner drawing data of the first physical page. The output 1106 illustrates the attribute of the output sheet used for outputting the first physical page. The paper attribute "glossy paper" has been selected. The determination of the paper attribute and the generation of the transparent toner drawing data are executed in step S503.

Suppose that one-sided printing has been designated by the user. In this case, in steps S602 through S604, the glossiness effect is acquired as the spot color effect for the first page. In addition, "glossy paper" has been selected as the paper attribute for implementing the glossiness effect. Furthermore, in order to implement the glossiness effect 1103 on the glossy paper, the data is drawn by applying the transparent toner in the region other than the region of the object 1103 as illustrated with the output state 1105 as the transparent toner drawing data.

In step S504, because data is not to be printed on the back surface of the sheet, the glossy paper is selected as the first optimum sheet.

The output 1107 is an output of the transparent toner drawing data for the second physical page. The output 1108 illustrates the output paper attribute for the second physical page. The attribute "matte paper" has been set as the paper attribute. Similar to the first page, the determination of the paper attribute of the second page and the generation of the transparent toner drawing data are executed in step S503.

A matte paper is set as the optimum sheet for the second page. In executing printing, the outputs 1105 through 1108 can be implemented by changing the output sheet to be actually used according to the printer information (paper feed stage information) and by executing a previously set inverse drawing mode as described above with reference to the flow charts of FIGS. 7 and 8.

Figure 12:
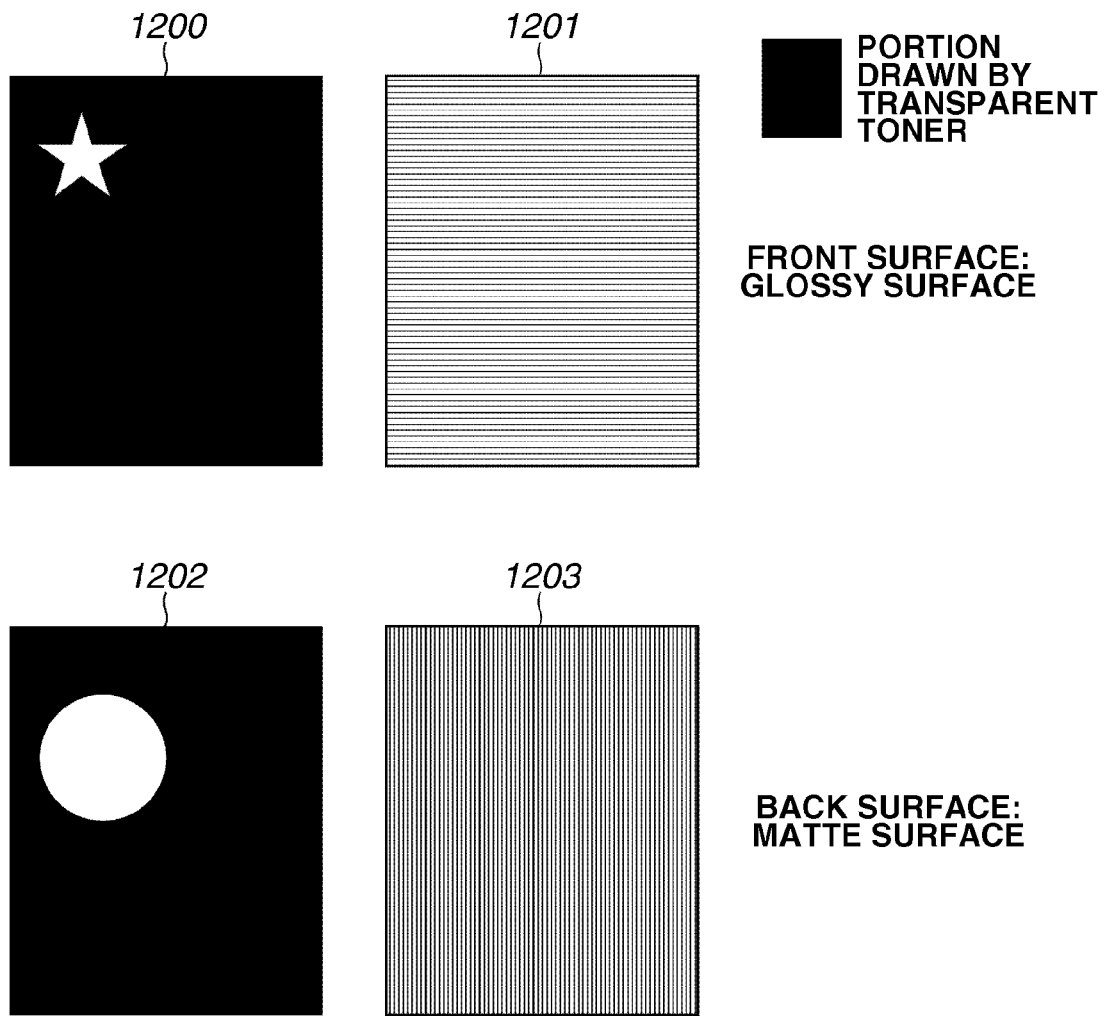
FIG. 12 illustrates an example output result of two-sided printing.

Referring to FIG. 12, outputs 1200 through 1203 are examples of types of paper and transparent toner drawing, when the document data 900 is printed using the printer 3, by two-sided printing and by using an optimum sheet for implementing the spot color effect. The output 1200 is a transparent drawing data (first drawing data) of the first physical page drawn by using the transparent toner. The output 1201 illustrates the attribute of the output sheet used for the first physical page. The attribute "glossy paper" has been selected as the paper attribute of the surface of the sheet. The determination of the paper attribute and the generation of the transparent toner drawing data are executed in step S503.

Suppose that two-sided printing has been designated by the user. In this case, in steps S602 through S604, the glossiness effect is acquired as the spot color effect for the first page. In addition, "glossy" has been selected as the paper attribute for implementing the glossiness effect. Furthermore, in order to implement the glossiness effect 1103 on the glossy paper, the output is drawn by using the transparent toner in the region other than the region of the object 1103 as illustrated with the output state 1200 as the transparent toner drawing data.

In step S504, because the data to be printed on the back surface exists, the paper attribute for the second physical page, which is to be printed on the sheet back surface, is determined. The output 1202 is a transparent toner drawing data of the first physical page drawn by using the transparent toner (second drawing data). The output 1203 illustrates the output paper attribute for the second physical page. The attribute "matte" has been set as the paper attribute. The determination of the paper attribute of the second page and the generation of the transparent toner drawing data are executed in step S506.

In step S507, a sheet whose front surface paper attribute is "glossy" and whose back surface paper attribute is "matte" is set as the optimum paper. As described above, if an optimum paper exists, the selection of the optimum paper and the generation of the transparent toner drawing data can be automatically executed.

Figure 13:
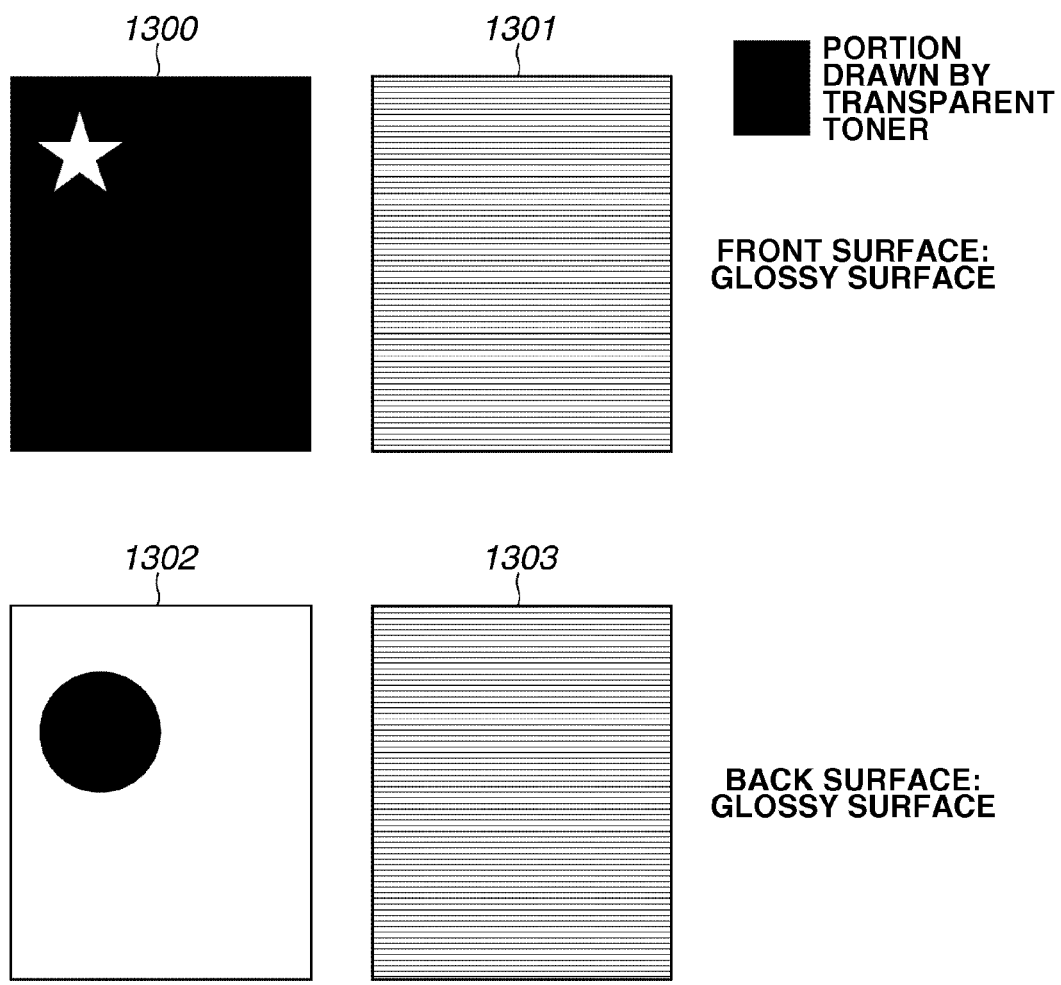
FIG. 13 illustrates an example output result of two-sided printing.

FIG. 13 illustrates output results if the optimum output paper selected in two-sided printing as described above with reference to FIG. 12 does not exist. In other words, the output results illustrated in FIG. 13 are output results generated as a result of the printing executed if a sheet whose front surface has the paper attribute "glossy" and whose back surface has the paper attribute "matte" does not exist but a sheet whose paper attributes of both the front surface and the back surface is "glossy" exists in the paper feed stage of the printer 3.

Outputs 1300 and 1301 are a combination of the sheet having the paper attribute and the transparent toner drawing data used in outputting the first physical page. In step S815, because the front surface has the paper attribute "glossy" (i.e., because the paper attribute of the front surface is the same as the paper attribute of the optimum paper), the outputs 1300 and 1301 are the same as the above-described outputs 1200 and 1201. Output 1302 and 1303 are a combination of the sheet having the paper attribute and the transparent toner drawing data used in outputting the second physical page.

In step S815, because the optimum attribute for the back surface is "matte" and the output sheet has the attribute "glossy", the negative/positive inversion is executed on the transparent toner drawing data. Accordingly, the transparent toner drawing data 1302 for the second page has the drawing content inverted from the output 1202.

With the above-described configuration, the present exemplary embodiment can automatically execute the selection of the sheet with which the spot color effect can be implemented and the generation of the transparent toner drawing data according to the print appearance even if the optimum paper does not exist in the paper feed stage.

Referring to FIG. 14, outputs 1400 and 1401 are output examples of the type of paper and the transparent toner drawing data, which are used in printing the document data 900 on the printer 3, by 2-in-1 printing (N-in-1 printing) and by using an optimum sheet for implementing the spot color effect.

The first drawing data and the second drawing data are printed by 2-in-1 printing. In this output example, the attribute "glossy", which is the paper attribute of the first logical page, has been selected as the output 1401, in step S606, as the paper attribute of the physical page.

By executing the processing in steps S607 through S609, the first physical page has the paper attribute "glossy". The second page has the paper attribute "matte", which is determined in step S603. Accordingly, the transparent toner drawing data of the second logical page is subjected to the negative/positive inversion as illustrated by the output 1400.

With the above-described configuration, the present exemplary embodiment can automatically execute the selection of the sheet with which the spot color effect can be implemented, and the generation of the transparent toner drawing data according to the print appearance even if a plurality of pages is to be allocated on one surface of the sheet according to the set print appearance.

As described above, in printing document data to which the spot color effect that requires the transparent toner has been designated, the present exemplary embodiment automatically selects an optimum paper according to the print appearance. In addition, the present exemplary embodiment generates the transparent toner drawing data according to the selected paper. With the above-described configuration, the present exemplary embodiment can readily implement the glossiness effect and the matte effect desired by the user.

In addition, if the optimum sheet does not exist in the printer, the present exemplary embodiment automatically generates transparent toner drawing data according to the sheet actually existing in the output apparatus. With the above-described configuration, the present exemplary embodiment can appropriately express the glossiness effect and the matte effect desired by the user.

Furthermore, as described above, the present exemplary embodiment can allow the user to select which of the selection of the paper and the negative/positive inversion on the transparent toner drawing data is to be prioritized in implementing the spot color effect. With the above-described configuration, the present exemplary embodiment can effectively reduce the number of times of switching of the output paper (paper feed stage) executed during printing. Accordingly, the present exemplary embodiment having the above-described configuration can increase the printing speed and reduce the amount of consumption of the transparent toner.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-201082 filed Sep. 8, 2010, which is hereby incorporated by reference herein in its entirety.

What is claimed is:

1. An image processing apparatus comprising:
 a designation unit configured, in printing each of input first drawing data and second drawing data by using a spot color printing material, to designate a spot color effect achieved by using the spot color printing material;
 a first output sheet attribute determination unit configured to determine a paper attribute for implementing the spot color effect designated for the first drawing data by the designation unit;
 a second output sheet attribute determination unit configured to determine a paper attribute for implementing the spot color effect designated for the second drawing data by the designation unit;
 a setting unit configured to execute a setting of a print appearance for printing the first drawing data and the second drawing data on one output sheet;
 a determination unit configured to determine a sheet having the attribute determined by the first output sheet attribute determination unit and the attribute determined by the second output sheet attribute determination unit as an output sheet onto which the first drawing data and the second drawing data are to be printed according to the print appearance set by the setting unit;

a first sheet-existence determination unit configured to determine whether or not the determined sheet having the attribute determined by the first output sheet attribute determination unit and the attribute determined by the second output sheet attribute determination unit exists in a paper feed stage;

a paper feed unit configured to feed the output sheet determined by the determination unit in a case where the determined output sheet is determined to exist in the paper feed stage;

a second sheet-existence determination unit configured to, in a case where the first sheet-existence determination unit determines that the determined output sheet having the attribute determined by the determination unit does not exist in the paper feed stage, determine whether printing using an output sheet existing in the paper feed stage can be performed by inverting either the first drawing data or the second drawing data;

a display control unit configured to display, on a display unit, a screen for instructing a user to store an output sheet having the attribute determined by the determination unit to the paper feed stage in a case where the second sheet-existence determination unit determines that printing using an output sheet existing in the paper feed stage cannot be performed by inverting either the first drawing data or the second drawing data; and an inversion unit configured to invert either the first drawing data or the second drawing data in a case where the second sheet-existence determination unit determines that printing using an output sheet existing in the paper feed stage can be performed by inverting either the first drawing data or the second drawing data.

2. The image processing apparatus according to claim 1, wherein the spot color effect is implemented on the output sheet by executing printing by using a transparent toner.

3. The image processing apparatus according to claim 1, wherein the determination unit is configured to determine an output sheet having the same attribute as the attribute of the output sheet as the output sheet to reduce a number of times of switching the output sheet.

4. The image processing apparatus according to claim 1, wherein the determination unit is configured to determine an output sheet to reduce an amount of consumption of the transparent toner.

5. A method for controlling an image processing apparatus, the method comprising:

designating, in printing each of input first drawing data and second drawing data by using a spot color printing material, a spot color effect achieved by using the spot color printing material;

determining a first paper attribute for implementing the designated spot color effect for the first drawing data;

determining a second paper attribute for implementing the designated spot color effect for the second drawing data;

setting a print appearance for printing the first drawing data and the second drawing data on one output sheet;

determining a sheet having the determined first paper attribute and the determined second paper attribute as an output sheet onto which the first drawing data and the second drawing data are to be printed according to the set print appearance;

determining whether or not the determined sheet having the determined first paper attribute and the determined second paper attribute exists in a paper feed stage;

feeding the determined output sheet in a case where the determined output sheet is determined to exist in the paper feed stage;

determining, in a case where the determined output sheet having the attribute determined by the determining is determined not to exist in the paper feed stage, whether printing using an output sheet existing in the paper feed stage can be performed by inverting either the first drawing data or the second drawing data;

displaying, on a display unit, a screen for instructing a user to store an output sheet having the determined attribute to the paper feed stage in a case where it is determined that printing using an output sheet existing in the paper feed stage cannot be performed by inverting either the first drawing data or the second drawing data; and inverting either the first drawing data or the second drawing data in a case where it is determined that printing using an output sheet existing in the paper feed stage can be performed by inverting either the first drawing data or the second drawing data.

6. The method for controlling the image processing apparatus according to claim 5, wherein the spot color effect is implemented on the output sheet by executing printing by using a transparent toner.

7. The method for controlling the image processing apparatus according to claim 5, wherein an output sheet having the same attribute as the attribute of the output sheet is determined as the output sheet to reduce a number of times of switching of the output sheet.

8. The method for controlling the image processing apparatus according to claim 5, wherein an output sheet is determined as the output sheet to reduce an amount of consumption of the transparent toner.

9. A non-transitory computer-readable storage medium storing a computer-executable instructions which, when executed by a computer, cause the computer to perform the method for controlling the image processing apparatus according to claim 5.

* * * * *